(12) United States Patent
Miller et al.

(10) Patent No.: US 10,352,370 B2
(45) Date of Patent: Jul. 16, 2019

(54) METHOD OF FORMING A CONSTANT VELOCITY JOINT BOOT

(71) Applicant: GKN Driveline North America, Inc., Auburn Hills, MI (US)

(72) Inventors: Michael James Miller, White Lake, MI (US); Richard Alfred Compau, Holly, MI (US)

(73) Assignee: GKN Driveline North America, Inc., Auburn Hills, MI (US)

(*) Notice: Subject to any disclaimer, the term of this patent is extended or adjusted under 35 U.S.C. 154(b) by 582 days.

(21) Appl. No.: 15/048,103

(22) Filed: Feb. 19, 2016

(65) Prior Publication Data
US 2016/0169295 A1 Jun. 16, 2016

Related U.S. Application Data

(63) Continuation of application No. 14/343,423, filed as application No. PCT/US2011/052568 on Sep. 21, 2011, now abandoned.

(51) Int. Cl.
*B29C 45/14* (2006.01)
*F16D 3/84* (2006.01)
(Continued)

(52) U.S. Cl.
CPC .............. *F16D 3/845* (2013.01); *B29C 70/68* (2013.01); *F16D 3/227* (2013.01); *B29C 45/14* (2013.01);
(Continued)

(58) Field of Classification Search
None
See application file for complete search history.

(56) References Cited

U.S. PATENT DOCUMENTS 2,178,953 A 11/1939 Chilton
2,432,803 A * 12/1947 Rice .................. F16D 3/845
403/37
(Continued)

FOREIGN PATENT DOCUMENTS

CN 1849462 10/2006
EP 1048864 A2 3/2000
(Continued)

OTHER PUBLICATIONS

JP Office Action for JP Application No. 2014-531768 dated Mar. 8, 2016 (2 pages).
(Continued)

*Primary Examiner* — Edmund H Lee
(74) *Attorney, Agent, or Firm* — Jennifer M. Brumbaugh; Reising Ethington P.C.

(57) ABSTRACT

A constant velocity joint boot assembly includes a boot-can having an axially extending main cylindrical body, a radially extending transition portion, an axially extending and generally cylindrical mounting portion. The radially extending transition portion intersects the axially extending main cylindrical body and the generally cylindrical mounting portion. A flexible boot member may be attached to an inner surface of at least two of the cylindrical body, the transition portion and the mounting portion at a coupling region. A method of forming the flexible boot member includes first forming the boot in an outwardly extending conical shape, and then rolling and/or inverting a portion of the boot so that the boot arcs inwardly upon itself and forms a diaphragm.

18 Claims, 4 Drawing Sheets

(51) Int. Cl.
*F16D 3/227* (2006.01)
*B29C 70/68* (2006.01)
*F16D 3/223* (2011.01)
*B29K 83/00* (2006.01)
*B29L 31/00* (2006.01)

(52) U.S. Cl.
CPC ..... *B29K 2083/00* (2013.01); *B29L 2031/748* (2013.01); *F16D 2003/22316* (2013.01)

(56) References Cited

U.S. PATENT DOCUMENTS

| | | | |
|---|---|---|---|
| 2,510,362 A | | 6/1950 | Anderson |
| 3,797,816 A | | 3/1974 | Voss |
| 3,822,570 A | | 7/1974 | Fisher |
| 5,707,066 A | * | 1/1998 | Sugiura ................... F16D 3/845 |
| | | | 277/634 |
| 6,676,527 B2 | | 1/2004 | Kudo et al. |
| 6,942,223 B2 | * | 9/2005 | Wang ...................... F16D 3/845 |
| | | | 277/634 |
| 7,297,065 B2 | | 11/2007 | Wang |
| 7,416,064 B2 | * | 8/2008 | Beck ........................ F16F 9/38 |
| | | | 188/322.12 |
| 7,488,259 B2 | * | 2/2009 | Sueoka ............ B29C 45/14336 |
| | | | 464/175 |
| 7,677,984 B2 | | 3/2010 | Hahn et al. |
| 8,070,376 B2 | | 12/2011 | Disser et al. |
| 8,414,406 B2 | * | 4/2013 | Dine ....................... F16D 3/845 |
| | | | 464/145 |
| 2004/0046283 A1 | * | 3/2004 | Cermak ................... B29C 57/00 |
| | | | 264/294 |
| 2006/0165933 A1 | | 7/2006 | Pfeifer et al. |
| 2007/0173337 A1 | | 7/2007 | Wormsbaecher et al. |
| 2007/0241518 A1 | * | 10/2007 | Dice ....................... F16D 3/845 |
| | | | 277/635 |
| 2009/0078084 A1 | * | 3/2009 | Compau ................... F16J 3/042 |
| | | | 74/608 |

FOREIGN PATENT DOCUMENTS

| | | | |
|---|---|---|---|
| JP | 05-027351 | | 4/1993 |
| JP | H0724683 U | | 5/1995 |
| JP | 07224857 | * | 8/1995 |
| JP | H08296662 | | 11/1996 |
| JP | 09-166150 | | 6/1997 |
| JP | H09166150 | | 6/1997 |
| JP | 2002286048 | | 10/2002 |
| JP | 2004034707 | * | 2/2004 |
| JP | 2005147208 | | 6/2005 |

OTHER PUBLICATIONS

Written Opinion & International Search Report for PCT/US2011/052568 dated Jun. 28, 2012, (10 pages).
JP Office Action for JP Application No. 2014-531768 dated Jun. 23, 2015 (2 pages).
CN Office Action for CN Application No. 201180073612.8 dated Sep. 25, 2015 (7 pages).
KR Office Action for KR Application No. 10-2014-7010626 dated Nov. 23, 2017 (8 pages).
EP Extended Search Report for EP Application No. 11872775.9 dated Oct. 24, 2016 (7 pages).

* cited by examiner

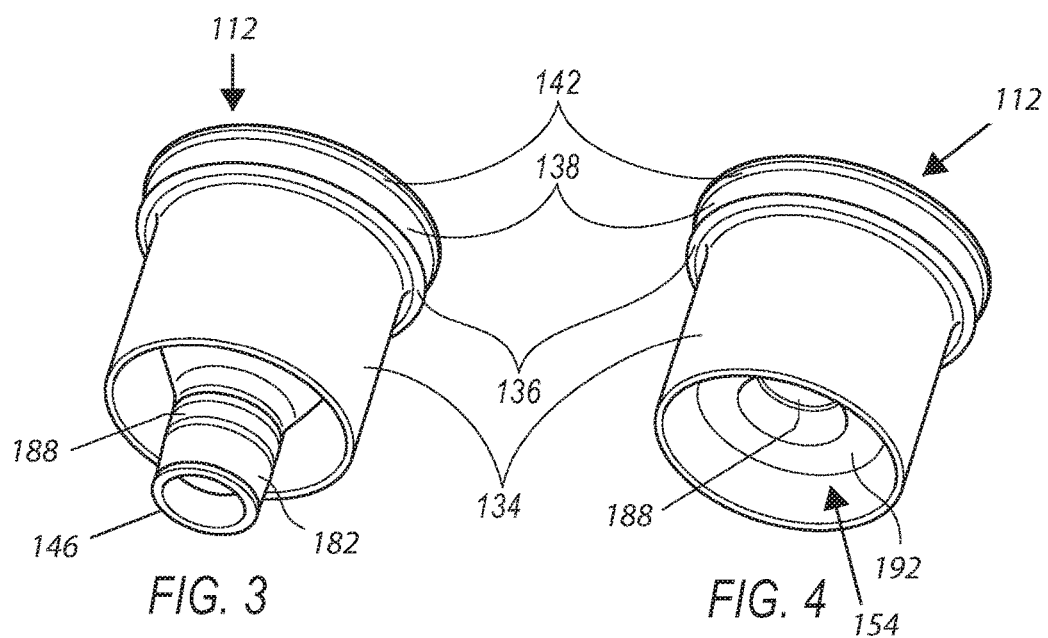

METHOD OF FORMING A CONSTANT VELOCITY JOINT BOOT

REFERENCE TO RELATED APPLICATIONS

This is a continuation of U.S. patent application Ser. No. 14/343,423 filed Mar. 7, 2014, now abandoned, which is a 35 U.S.C. § 371 national stage application claiming priority to PCT Serial No. PCT/US2011/052568 filed Sep. 21, 2011, the entire contents of which are incorporated herein by reference.

TECHNICAL FIELD

The present disclosure generally relates to constant velocity joints and, more particularly, to high-speed constant velocity joint and external rolling diaphragm boot cover assemblies.

BACKGROUND

Constant velocity joints and similar rotating couplings operate to transmit torque between two rotational members. The constant velocity joint typically includes an inner joint member for engagement with one rotational member, an outer joint member for engagement with the other rotational member, and a boot cover assembly or a grease cover to enclose and protect the rotating assembly positioned within the outer member during operation. Since the boot cover assembly is partially flexible, the boot cover assembly is able to seal around one of the rotating members while permitting articulation and relative axial movement between the two rotating members. The boot cover assembly provides a barrier to retain the grease in the internal cavity of the joint so as to reduce friction and extend the life of the joint. The boot cover assembly helps to seal out dirt, water and other contaminants to protect the functionality of the joint.

Constant velocity joints require constant lubrication (grease) to remain in operation in the environment in which they are utilized. Typically, such joints use a sealed system to contain the grease, the main component of which is the boot cover assembly that includes a boot and associated mounting can. Boots come in a variety of types. Some examples include convoluted, internal rolling diaphragm (IRD) and external rolling diaphragm (ERD). Particularly relating to IRD and ERD boots, the current industry standard is to have the diaphragm boot crimped onto the mounting can, and then to have the mounting can fit onto the joint. The mounting can and boot may be vulcanized together or crimped together at the top only, which allows grease that is under pressure from centrifugal forces during the joint rotation to be pushed between the sides of the boot and the mounting can (blow-out).

However, an important characteristic of the constant velocity joint is the ability of the joint to allow relative axial movement between two shafts while maintaining a seal to the outside environment. Typically, constant velocity joints include a seal groove that extends circumferentially about the outer surface of the outer member. This groove is generally machined or cut into the outer joint member, causing additional labor, cost and time. The groove provides a channel for receiving and positioning an o-ring type seal at a connection point between the boot assembly, boot-can and the outer member of the constant velocity joint. The seal is used to help prevent the blow-out phenomenon associated with the build-up of pressure.

Additionally, the centrifugal forces and friction associated with the internal components of the constant velocity joint assembly result in expansion or ballooning of the flexible boot cover as a result of the pressure created from heat and high speed operation. The deformation of the flexible boot cover may be affected by lubricant load, a pumping action of the lubricant due to constant velocity joint articulation, temperature, speed, release of gas volatiles from the grease, and the shape of the flexible boot. The constant expansion and contraction of the flexible member results in fatigue, wear and eventual failure of the flexible boot and ultimately the constant velocity joint. Typically, a vent is provided to relieve any pressure and minimize or eliminate the expansion of the flexible boot. However, this vent also allows dirt, water and other debris to enter the constant velocity joint. Specifically, venting the constant velocity joint can lead to lubricant leakage or loss, as well as the infiltration of contaminants into the joint, reducing its overall life.

What is needed, therefore, is a constant velocity joint and boot cover assembly that eliminates the need for a separate seal disposed about the outer surface of the outer member. Additionally, there is a need for a constant velocity joint and boot cover assembly that is configured to eliminate the need for a flexible boot vent.

SUMMARY

The present application discloses a constant velocity joint boot assembly. The constant velocity joint boot assembly may include a boot-can having an axially extending main cylindrical body, a radially extending transition portion, an axially extending and generally cylindrical mounting portion. The radially extending transition portion may intersect the axially extending main cylindrical body and the generally cylindrical mounting portion. A flexible boot member may be attached to an inner surface of at least two of the cylindrical body, the transition portion and the mounting portion at a coupling region for use with an associated constant velocity joint (CVJ). The present application may be applicable to a wide variety of CVJ's, including, but not limited to, plunging, tripod, fixed and high speed. The boot may be affixed to at least two internal surfaces of the boot-can by any known process such as, but not limited to, overmoulding, adhering and bonding. Specifically, the flexible boot may be affixed to a first joint connection end, such that the boot creates a seal between an end surface of the CVJ and the first end of the boot-can. By positioning the flexible boot between the boot-can and the CVJ, the need for an exteriorly positioned seal is eliminated.

BRIEF DESCRIPTION OF THE DRAWINGS

Referring now to the drawings, preferred illustrative embodiments are shown in detail. Although the drawings represent some embodiments, the drawings are not necessarily to scale and certain features may be exaggerated, removed, or partially sectioned to better illustrate and explain the present disclosure. Further, the embodiments set forth herein are not intended to be exhaustive or otherwise limit or restrict the claims to the precise forms and configurations shown in the drawings and disclosed in the following detailed description:

FIG. 3 illustrates an isometric view of a flexible boot assembly with the flexible boot in an "as molded" position;

FIG. 4 illustrates an isometric view of a flexible boot assembly with the flexible boot and further including the diaphragm in position;

DETAILED DESCRIPTION

Figure 1:
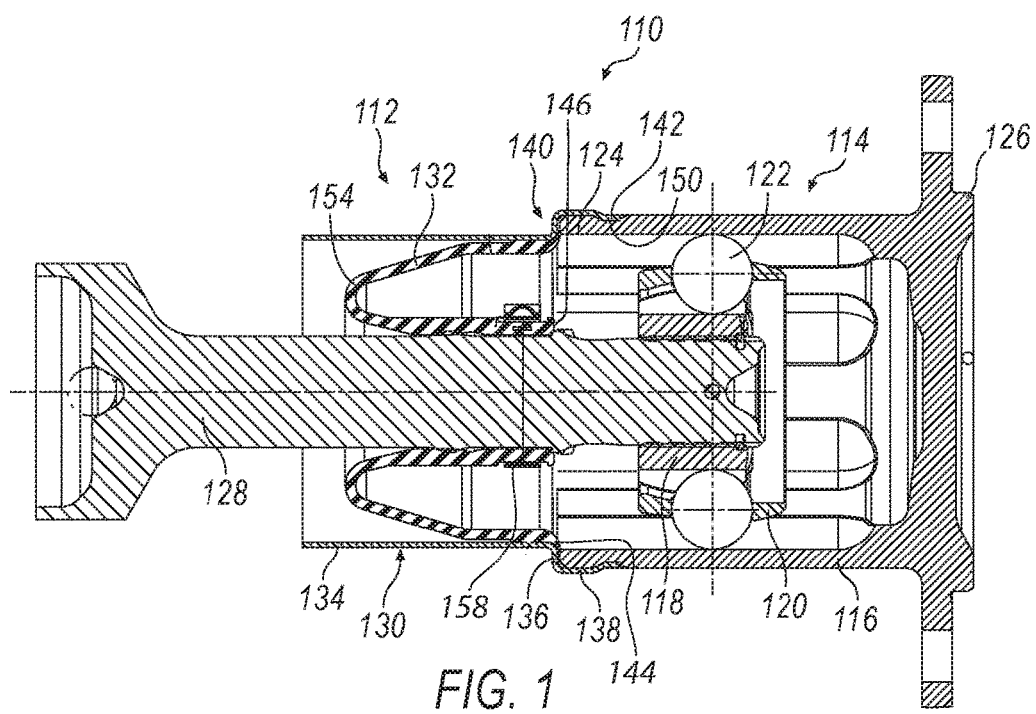
FIG. 1 illustrates a side cross-sectional view of a constant velocity joint assembly and attached flexible boot assembly.

FIG. 1 illustrates one implementation of a CVJ assembly 110 incorporating a boot assembly 112. More specifically, CVJ assembly 110 may include flexible boot assembly 112 and CVJ 114. The CVJ 114 may include an outer joint member 116, an inner joint member 118, a joint cage 120 and a plurality of torque transmitting balls 122. The outer joint member 116 may include a first end 124 and a second end 126. The first end 124 may be configured to mate with the flexible boot assembly 112, and the second end 126 maybe engaged with a second rotational member (not shown). A first rotational member or drive shaft 128 may extend through the flexible boot assembly 112 and may be engaged with or affixed to the inner joint member 118.

With continued reference to FIG. 1, the flexible boot assembly 112 may include a generally cylindrical boot-can 130 configured to receive a flexible boot 132. As discussed above, flexible boots may come in a variety of types. Merely by way of example, internal rolling diaphragm (IRD) and external rolling diaphragm (ERD) boots are discussed in greater detail below. The flexible boot 132 includes a first end 144 and a second end 146. The first end 144 may be configured to bond to the generally cylindrical boot-can 130. The exemplary flexible boot 132 may be constructed of a flexible material, such as, but not limited to, rubber based products, plastics, silicones, elastomers, silicone, thermoplastic elastomer (TPE), and any other flexible composite materials. It is understood, however, that other suitable materials may be used depending on the application, such as, but not limited to, materials having a hardness value in the range of about 55-75 Shore A or about 35-55 Shore D. In another embodiment, the material may have a hardness of about 40-44 Shore D. Materials that are specifically compatible with a typical flexible boot cover assembly 112 environment are relatively rigid thermoplastic polyesters due to the desirable bonding formed in coupling region 140 during a molding process, which may be used to secure the boot 132 to the boot-can 130, as will be explained below.

The generally cylindrical boot-can 130 may include an axially extending main cylindrical body 134, a radially extending transition portion 136, and an axially extending and generally cylindrical mounting portion 138. The boot-can 130 is formed of a first substantially rigid material, such as, but not limited to, aluminum, steel, carbon fiber and composite.

In one exemplary arrangement, the flexible boot 132 may be molded directly to the boot-can 130 to create a physical and/or a chemical bond at a coupling region 140. The coupling region 140 may extend from a portion of the axially extending main cylindrical body 134, across the radially extending transition portion 136 and terminating at a portion of the axially extending and generally cylindrical mounting portion 138. The coupling region 140 allows the bond between the flexible boot 132 and the boot-can 130 to occur on at least two surfaces. The arrangement, as shown in the drawings, details that the two surfaces are perpendicular.

As illustrated, the generally cylindrical mounting portion 138 may be configured to engage with and mate to an outer surface of the first end 124 of the outer joint member 116. Additionally, the first end 124 may also include an engagement groove 150 that extends circumferentially about the outer surface of the outer joint member 116. The engagement groove 150 may provide a tactile indicator or positive stop for engaging a lip 142 on the generally cylindrical mounting portion 138.

Figure 2A:
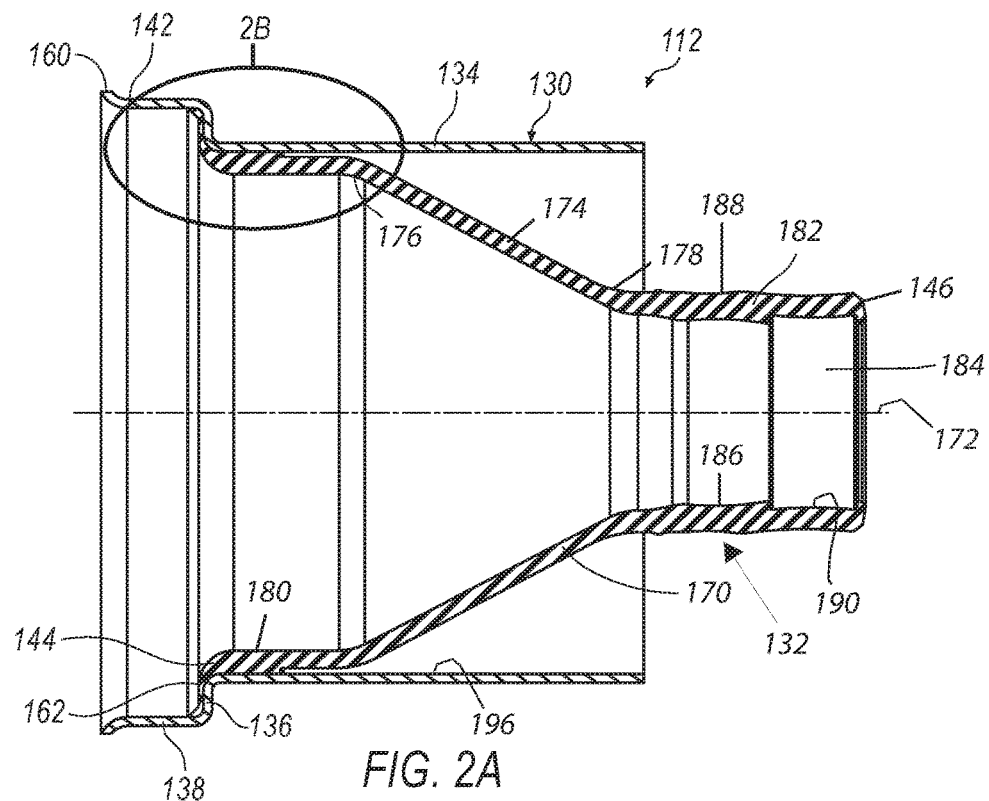
FIG. 2A illustrates a side cross-sectional view of a flexible boot assembly.
Figure 2B:
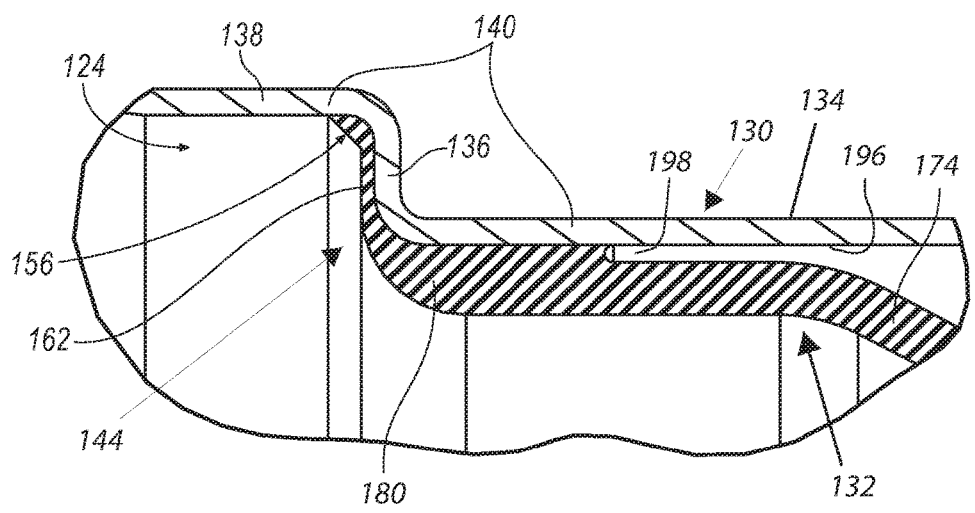
FIG. 2B illustrates an enlarged view of encircled area 2B of the flexible boot and boot-can coupling region.

FIGS. 2A and 2B show the boot assembly 112. In these figures, the flexible boot 132 is illustrated in a pre-assembled "as-molded" state. In one implementation of forming the boot assembly, the boot-can 130 is placed in a mold (not shown), and the boot is molded onto the boot can in a cone shape, which generally mimics the characteristics of an IRD shape. In this form, the boot 132 is hollow and has a circumferentially continuous sidewall 170 that may be symmetrical about a center line or axis 172 (although it is acknowledged portions may flex in use and are not coaxial when flexed), and extends axially between the first end 144 and second end 146. The thickness of the sidewall 170 may vary along the axial length between ends 144 and 146, and the diameter of the sidewall varies along its length as set forth in more detail below.

In the "as-molded" state, the first end 144 of the boot 132 has a diameter that is larger than the second end 146 of the boot. A transition portion 174 extends between the first end 144 and the second end 146. The transition portion 174 includes at least a portion with a decreasing diameter and has a first junction 176 associated with the first end 144 and a second junction 178 associated with the second end 146.

In the example shown, the first junction 176 blends with a generally cylindrical and axially extending base 180 that leads to a radially extending seal portion 162 that is adapted to be trapped between the transition portion 136 of boot can 130 and the first end 124 of the outer joint member 116. As set forth below the base 180 is adapted to be closely overlied by and/or bonded to the boot can 130 to, for example, limit or prevent outward expansion or ballooning of the base 180. The second junction 178 blends with a shaft receiving portion 182 of the boot 132.

Figure 6:
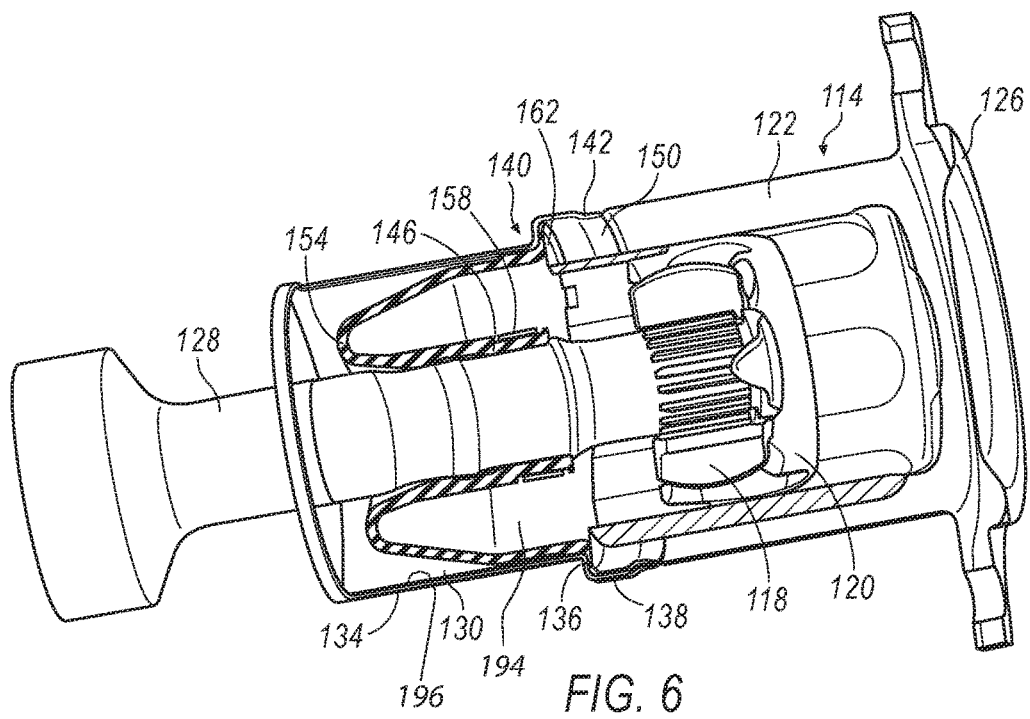
FIG. 6 illustrates an isometric partial cross-sectional view of a constant velocity joint assembly and attached flexible boot assembly.

The shaft receiving portion 182 extends a desired axial length to the second end 146 of the boot 132, and is shown as being generally cylindrical although it may be tapered or otherwise shaped as desired. The shaft receiving portion 182 defines an opening or passage 184 into which the shaft 128 may be received in assembly of the CVJ, as shown in FIGS. 1 and 6. In this first or as-molded state, as shown in FIG. 2A, the second end 146 is spaced axially further from the first end 144 than the second junction 178. In the as-molded state, the shaft receiving portion 182 includes a first surface 186 facing inwardly toward the axis 172 and a second surface 188 facing outwardly, away from the axis 172. The first surface 186 includes a groove 190 between the second end 146 and the second junction 178, that, in assembly, receives a clamp, band 158 (FIGS. 1 and 6) or other connector holding the boot 132 onto the shaft 128.

Figure 5:
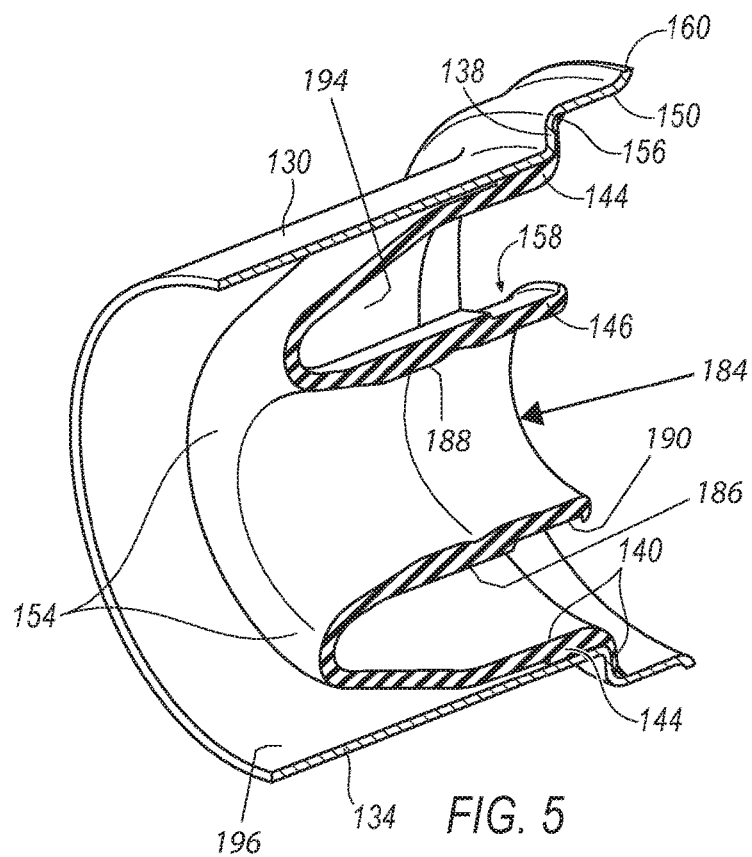
FIG. 5 illustrates an isometric cross-sectional view of a flexible boot assembly with the flexible boot diaphragm in position.

During assembly a portion of the boot 132 may be inverted to create the ERD shape, which creates a diaphragm or bend 154 (shown in FIG. 1), as discussed above. In more detail, the second end 146 of the boot 132 is pushed axially toward the first end 144, in the direction of arrow A, and turned inside out or inverted. To do this, the second end 146 is folded or rolled inwardly into the opening or passage 184 and toward the axis 172 and pulled or pushed through the shaft receiving portion 182. This defines a bend 154 in the sidewall 170 that travels axially as the second end 146 is moved toward the first end 144. The result is best shown by comparison of FIG. 2A with FIG. 5. After the movement and inversion of the second end 146, the second end 146 is closer to the first end 144 than is the second junction 178, a bottom 192 of the bend 154 defines an axially outermost end of the boot 132 (and is spaced further from the first end 144 than is the second end 146), the first surface 186 of the second end 146 is now facing outwardly away from the axis 172, and the second surface 188 is facing inwardly toward the axis 172. In this state, the second surface 188 defines the opening or passage 184 in which the shaft 128 is received. The bend 154 may be defined within the transition portion 174, between the first and second ends 144, 146. Also, in this second state, a portion of the sidewall 170 between the second end 146 and the bottom 192 of the bend 154 is received within and radially overlapped (along some axial length) by at least a portion of the sidewall between the first end 144 and the bottom 192 of the bend 154. In at least some implementations, the overlapped portions are radially spaced apart and together with the bend 154 define a concave and annular channel 194 that is open to and faces the first end 144. In this arrangement, as shown in FIG. 6, the shaft 128 extends along the axis 172 and is received through the opening or passage 184 in the boot 132 which may be connected thereto by the band 158 received in the groove 190, now facing outwardly and away from the axis 172.

With regard to the boot can 130, the axially extending main cylindrical body 134 intersects the radially extending transition portion 136 and in one exemplary arrangement, forms a first generally 90° angle at the coupling region 140. Additionally, the transition portion 136 intersects the generally cylindrical mounting portion 138 to create a second generally 90° angle, which as illustrated, the first and second generally 90° angle intersections may resemble a stepped feature. It should be known that additional intersecting angles may be sufficient provided the surfaces 134, 138 intersect the transition portion 136. Additionally, other boot-can 132 configurations may also be used including boot-cans that have non-linear walls with bends or other shaped features configured in/on the boot-can 130 based on the clearance needs and application needs, as related to the various constant velocity joints employed. These features may include projections 160 at an outer edge or curves formed on the boot-can 130 for clearance related to the internal constant velocity joint 114 components 118, 120 and 122.

With reference to FIGS. 2A and 2B, the flexible boot 132, as discussed above, in one exemplary arrangement is illustrated as being overmoulded to a portion of an interior surface 196 of the boot-can 130 at the coupling region 140, such that a portion of the flexible boot 132 and a portion of the boot-can 130 are bonded together at a predetermined dimensional area using known methods. Specifically, the predetermined dimensional area includes a portion of the flexible boot 132 that may include the first end and/or a portion of the boot adjacent to the first end (e.g. closer to the first end than the second end), which may be, in on exemplary arrangement, approximately 1.5 mm to 3 mm thick in the area directly adjacent the axially extending portion of the coupling region 140, and the flexible boot 132 may be approximately 0.25 mm to 1 mm thick at the coupling region adjacent the transition portion 136. The area bonded to the axially extending main cylindrical body 134 may extend approximately 7.5 mm to 10.5 mm from an internal face 148 of the transition portion 136 along the interior surface of the coupling region 140. Thus, it should be known that the coupling region 140 bonds a total length of approximately 8.5 mm to 14.5 mm, covering at least two external surfaces of the flexible boot 132 and the internal surfaces of the boot-can 130, as discussed above.

Turning specifically to FIG. 2B, a continued area of adhesion or bonding is illustrated in detail. The area of bonding between the boot and boot can may include all or less than all of the coupling region 140, which may include all or a portion of the base 180 adjacent to the first end 144 and extending to the intermediate portion 174. In the implementation shown, the base 180 includes a radially thicker region of the sidewall in the coupling region 140 and a radially thinner section between the coupling region and the intermediate portion, providing a gap 198 between a portion of the ring and the boot can interior surface 196. An angled projection 156 may be provided adjacent to an intersection of the transition portion 136 and the generally cylindrical mounting portion 138 at or near the first end 144. Specifically, in one exemplary arrangement, the projection 156 is formed at an approximately 45° angle, which may provide an additional thickness of flexible boot 132 materials at the interior corner of the boot can 130. This additional thickness of material may be flexible enough to provide additional sealing capabilities in assembly of the CVJ. Specifically, the flexible boot 132 may compress and assume a connection area (not illustrated) between the CVJ face 162 and the boot-can coupling region 140 when the flexible boot assembly 112 is mated with the CVJ assembly 114 to create the CVJ assembly 110. The created seal between the two assemblies 112, 114 eliminates the need for an auxiliary seal (not shown) positioned on the outer surface of the outer joint member 116 as is commonly found in previous CVJ assemblies (not shown).

Referring to FIGS. 3 and 4, as noted above, the flexible boot assembly 112 may be partially inverted to convert the "as-molded" outwardly extending IRD conical shaped boot (See FIGS. 2A and 3) to an ERD shape where the flexible boot 132 arcs or is rolled inwardly upon itself (See FIGS. 1 and 4-6) to create the diaphragm or bend 154. Specifically, turning to FIG. 5 an exemplary section view of the flexible boot assembly 112 is illustrated with the first end 144 molded to the boot-can 130 at the coupling region 140 and the second end 146 is now adjacent the coupling region 140. The ERD shape creates the external diaphragm 154 that extends away from the CVJ with its channel 194 facing and open to the CVJ, which appears as a balloon effect that may expand and contract without permanent deformation that may damage the flexible boot 132.

Turning to FIG. 6, an isometric partial cross-sectional view of the exemplary CVJ assembly 110 is illustrated. Specifically, when the boot-can 130 is engaged with the CVJ 114, a portion of the flexible boot 132 that is bonded to the coupling region 140 may be in a compressed state between the boot-can 130 and the CVJ face 162 of the outer joint part 116. Compression of the portion of the flexible boot 132 provides a seal between the CVJ 114 and the boot-can 130. The angled area 156, if incorporated, may provide additional material to compress to seal the compression area (not shown) that may be present due to a chamfer or other machined feature on the end of the CVJ 114. Additionally, as illustrated in FIG. 4, the second end 146 of the flexible boot 132 extends circumferentially around the rotating member 128. A band 158 or other type of tightening element may be used to secure the flexible boot 132 to the shaft/rotating member 128 that is engaged with the inner joint member 118 of the CVJ 114.

The exemplary embodiments of FIGS. 1-6 depict an exemplary CVJ assembly 110 that provides an operator with the ability to reduce manufacturing time and provides a more resilient CVJ with an increased life. As illustrated in the exemplary embodiments, an operator (not shown) may assemble the flexible boot assembly 112 and the CVJ assembly 114 without the use of an auxiliary seal extending about the outside edge of the outer joint 116. Additionally, by providing a flexible boot assembly 112 that is adhered to the boot-can 130, as described above, the assembly is able to use a flexible boot that has a unitary body without the need for any auxiliary vent apertures. Thus, as discussed above, exemplary embodiments have been illustrated that depict a CVJ assembly 110 that includes a flexible boot that compresses between the coupling region 140 and the CVJ face 162. This compressed area creates a sealed feature between the two 140, 162 and eliminates the exterior seal while providing a solid attachment surface. Specifically, when the second end 146 of the flexible boot 132 is secured to the shaft 128 by the band 158 the flexible boot 132 is able to expand and contract without the use of a vent. Therefore, the elimination of the vent apertures provides a more resilient CVJ assembly by eliminating any debris or contaminates that may flow into the previously provided vent on previous designed boot assemblies (not shown).

The present invention has been particularly shown and described with reference to the foregoing embodiment, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and nonobvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

The invention claimed is:

1. A method of forming a constant velocity joint boot, comprising:
providing a boot that has an axis and is formed from a flexible material in a first state with a first end of a larger diameter than a second end, and with a first distance between the first end and the second end, and with a portion of the boot adjacent to the second end having a first surface facing inwardly toward the axis and a second surface facing outwardly away from the axis;
moving the second end toward the first end to provide a second distance between the first end and the second end that is less than the first distance; and
inverting the portion of the boot adjacent to the second end so that the first surface faces outwardly away from the axis and the second surface faces inwardly toward the axis without inverting the first end of the boot.

2. The method of claim 1, wherein second end defines an opening and inverting the second end is accomplished by rolling the portion of the boot adjacent to the second end inwardly into the opening and moving the second end toward the first end.

3. The method of claim 1, wherein the inverting step occurs during the moving step and is accomplished by rolling the portion of the boot adjacent to the second end inwardly into the opening and moving the second end toward the first end.

4. The method of claim 1, wherein the inverting step creates a roll in the boot that is u-shaped in cross-section and has a bottom, and wherein after the inverting step and the moving step the bottom of the roll defines an axial end of the boot.

5. The method of claim 4, wherein after the moving step and the inverting step the second distance is less than the distance between the bottom of the roll and the first end.

6. The method of claim 1, which also comprises providing a boot can formed from a rigid material and wherein the step of providing the boot includes overmolding a portion of the boot can with the boot to bond a portion of the boot to the boot can at a coupling region.

7. The method of claim 6, wherein the coupling region includes the first end of the boot.

8. A method of forming a constant velocity joint boot, comprising:
providing a boot can;
bonding a boot that has an axis and is formed from a flexible material to the boot can, the boot having a first end of a larger diameter than a second end, with a first distance between the first end and the second end, and with a portion of the boot adjacent to the second end having a first surface facing inwardly toward the axis and a second surface facing outwardly away from the axis,
moving the second end toward the first end to provide a second distance between the first end and the second end that is less than the first distance; and
inverting the portion of the boot adjacent to the second end so that the boot is in a second state in which the first surface faces outwardly away from the axis and the second surface faces inwardly toward the axis, wherein the moving step and inverting step occur after the bonding step, and wherein the first end is not inverted.

9. The method of claim 8, wherein the bonding step includes overmolding a portion of the boot can with the boot.

10. The method of claim 9, wherein the first end of the boot or material adjacent to the first end of the boot is overmoulded onto the boot can.

11. The method of claim 8, wherein the boot is overmoulded onto an interior surface of the boot can.

12. The method of claim 8, wherein second end defines an opening and inverting the second end is accomplished by rolling the portion of the boot adjacent to the second end inwardly into the opening and moving the second end toward the first end.

13. The method of claim 8, wherein the inverting step occurs during the moving step and is accomplished by rolling the portion of the boot adjacent to the second end inwardly into the opening and moving the second end toward the first end.

14. The method of claim 8, wherein the inverting step creates a roll in the boot that is u-shaped in cross-section and has a bottom, and wherein after the inverting step and the moving step the bottom of the roll defines an axial end of the boot.

15. The method of claim 14, wherein after the moving step and the inverting step the second distance is less than the distance between the bottom of the roll and the first end.

16. A method of forming a boot, comprising:
- forming a boot from a flexible material and in an outwardly extended conical shape, and wherein the boot is hollow and has a first end and a second end with an opening defined by at least the second end; and
- inverting the second end of the boot by rolling the second end inwardly into the opening and moving the second end toward the first end so that the boot arcs inwardly upon itself and forms a diaphragm while not inverting the remainder of the boot.

17. The method of claim 16, wherein the inverting step creates a roll in the boot, and wherein the diaphragm is defined by the roll.

18. The method of claim 16, wherein the boot is overmoulded onto a boot can in the outwardly extended conical shape, and the second end of the boot is inverted relative to the boot can.

* * * * *